(12) United States Patent
Lownsbrough et al.

(10) Patent No.: US 7,774,456 B1
(45) Date of Patent: *Aug. 10, 2010

(54) METHODS, APPARATUSES AND SYSTEMS FACILITATING CLASSIFICATION OF WEB SERVICES NETWORK TRAFFIC

(75) Inventors: Derek Leigh Lownsbrough, Kelowna (CA); Edward G. Bruck, Kelowna (CA)

(73) Assignee: Packeteer, Inc., Cupertino, CA (US)

( * ) Notice: Subject to any disclaimer, the term of this patent is extended or adjusted under 35 U.S.C. 154(b) by 1169 days.

This patent is subject to a terminal disclaimer.

(21) Appl. No.: 10/788,646

(22) Filed: Feb. 27, 2004

(51) Int. Cl.
*G06F 15/173* (2006.01)
(52) U.S. Cl. .................. 709/224; 709/217; 709/225; 713/153
(58) Field of Classification Search ............. 709/224, 709/225
See application file for complete search history.

(56) References Cited

U.S. PATENT DOCUMENTS

| | | | | |
|---|---|---|---|---|
| 6,046,980 A * | 4/2000 | Packer | ................. | 370/230 |
| 6,285,658 B1 * | 9/2001 | Packer | ................. | 370/230 |
| 6,412,000 B1 * | 6/2002 | Riddle et al. | ................. | 709/224 |
| 6,591,299 B2 * | 7/2003 | Riddle et al. | ................. | 709/224 |
| 6,924,751 B2 * | 8/2005 | Hempel et al. | .......... | 340/995.12 |
| 6,950,405 B2 * | 9/2005 | Van Gerrevink | ............. | 370/252 |
| 7,117,504 B2 * | 10/2006 | Smith et al. | ................. | 719/328 |
| 7,302,480 B2 * | 11/2007 | Lahtinen | ................. | 709/224 |
| 7,321,880 B2 * | 1/2008 | Gosby | ................. | 706/20 |
| 7,324,553 B1 * | 1/2008 | Varier et al. | ................. | 370/468 |
| 7,366,101 B1 * | 4/2008 | Varier et al. | ................. | 370/241 |
| 7,457,870 B1 * | 11/2008 | Lownsbrough et al. | ..... | 709/224 |
| 2002/0055998 A1 * | 5/2002 | Riddle et al. | ................. | 709/224 |
| 2002/0174178 A1 * | 11/2002 | Stawikowski | ................. | 709/203 |
| 2003/0005181 A1 * | 1/2003 | Bau et al. | ................. | 709/330 |
| 2003/0012141 A1 * | 1/2003 | Gerrevink | ................. | 370/250 |
| 2003/0093436 A1 * | 5/2003 | Brown et al. | ................. | 707/103 Z |
| 2003/0095540 A1 * | 5/2003 | Mulligan et al. | ................. | 370/352 |
| 2003/0102986 A1 * | 6/2003 | Hempel et al. | ................. | 340/905 |
| 2003/0115548 A1 * | 6/2003 | Melgar | ................. | 715/513 |
| 2003/0140140 A1 * | 7/2003 | Lahtinen | ................. | 709/224 |
| 2003/0182364 A1 * | 9/2003 | Large et al. | ................. | 709/203 |
| 2003/0204645 A1 * | 10/2003 | Sharma et al. | ................. | 709/328 |
| 2003/0220925 A1 * | 11/2003 | Lior | ................. | 707/10 |
| 2004/0030627 A1 * | 2/2004 | Sedukhin | ................. | 705/36 |
| 2004/0031038 A1 * | 2/2004 | Hugly et al. | ................. | 719/315 |

(Continued)

OTHER PUBLICATIONS

Wikipedia, Counter, pp. 1-8.*

(Continued)

*Primary Examiner*—Hassan Phillips
*Assistant Examiner*—Backhean Tiv
(74) *Attorney, Agent, or Firm*—Baker Botts L.L.P.

(57) ABSTRACT

Methods, apparatuses and systems that facilitate the classification of web services network traffic. In one implementation, the present invention processes interface definitions corresponding to a given Web service to construct a traffic classification configuration for the Web service, including one or more traffic classes and corresponding matching rules or attributes for each traffic class. In one implementation, the present invention automatically creates traffic classes and matching rules that allow for differentiation between the operations supported by a Web service. Implementations of the present invention provide a mechanism allowing for classification of Web services network traffic on a granular basis to enhance network monitoring and analysis tasks, as well as network control functions, such as bandwidth management, security and other functions.

24 Claims, 7 Drawing Sheets

U.S. PATENT DOCUMENTS

| | | | |
|---|---|---|---|
| 2004/0045005 A1* | 3/2004 | Karakashian | 719/310 |
| 2004/0068424 A1* | 4/2004 | Lee et al. | 705/7 |
| 2004/0083262 A1* | 4/2004 | Trantow | 709/203 |
| 2004/0103186 A1* | 5/2004 | Casati et al. | 709/224 |
| 2004/0111504 A1* | 6/2004 | Halim et al. | 709/223 |
| 2004/0128670 A1* | 7/2004 | Robinson et al. | 718/1 |
| 2004/0148326 A1* | 7/2004 | Nadgir et al. | 709/200 |
| 2005/0015375 A1* | 1/2005 | Harjanto | 707/10 |
| 2005/0038867 A1* | 2/2005 | Henderson et al. | 709/217 |
| 2005/0060372 A1* | 3/2005 | DeBettencourt et al. | 709/206 |
| 2005/0065879 A1* | 3/2005 | Birch et al. | 705/40 |
| 2005/0080661 A1* | 4/2005 | Casati et al. | 705/10 |
| 2005/0125440 A1* | 6/2005 | Hirst | 707/103 R |
| 2005/0125771 A1* | 6/2005 | Vitanov et al. | 717/104 |
| 2005/0154785 A1* | 7/2005 | Reed et al. | 709/217 |
| 2005/0202392 A1* | 9/2005 | Allen et al. | 434/362 |
| 2006/0265689 A1* | 11/2006 | Kuznetsov et al. | 717/117 |
| 2007/0150546 A1* | 6/2007 | Karakashian et al. | 709/207 |

OTHER PUBLICATIONS

Mukhi, Nirmal, "Web service invocation sans SOAP", Sep. 1, 2001, pp. 1-7.*

* cited by examiner

METHODS, APPARATUSES AND SYSTEMS FACILITATING CLASSIFICATION OF WEB SERVICES NETWORK TRAFFIC

CROSS-REFERENCE TO RELATED PATENTS AND APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/099,629 in the name of Brett Galloway, Mark Hill, and Anne Cesa Klein, entitled "Method And System For Controlling Network Traffic Within The Same Connection With Different Packet Tags By Varying The Policies Applied To A Connection;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/453,345, in the name of Scott Hankins, Michael R. Morford, and Michael J. Quinn, entitled "Flow-Based Packet Capture;" and U.S. patent application Ser. No. 10/611,573, in the name of Roopesh Varier, David Jacobson, and Guy Riddle, entitled "Network Traffic Synchronization Mechanism."

FIELD OF THE INVENTION

The present invention relates to classification of network traffic for the purposes of analysis, reporting and/or control and, more particularly, to methods, apparatuses and systems that facilitate the identification and classification of web services network traffic.

BACKGROUND OF THE INVENTION

Web services networks are rapidly evolving technology architectures allowing applications to tap into a variety of services in an extremely efficient and cost effective manner. Web services enable cost-effective and efficient collaboration among entities within an enterprise or across enterprises. Web services are URL or IP addressable resources that exchange data and execute processes. Essentially, Web services are applications exposed as services over a computer network and employed by other applications using Internet standard technologies, such as XML, SOAP, WSDL, etc. Accordingly, Web applications can be quickly and efficiently assembled with services available within an enterprise WAN or external services available over open computer networks, such as the Internet.

The interface to web services are typically defined in an interface definition document. The Interface Definition Language (IDL) was introduced in the early 1990s by a consortium of large corporations known as the Object Management Group (OMG). The purpose of IDL was to provide a standard platform- and language-independent grammar by which the interfaces used to connect software components are described. IDL became one of the cornerstones of CORBA technology, and variants such as MIDL (developed by Microsoft® Corporation) have been used to describe the interfaces employed by a number of other component architectures. The emergence of Web services spurred the creation of a conceptually and syntactically similar interface description language, Web Services Description Language (WSDL), intended to address the unique issues associated with Web-based protocols. WSDL has been widely adopted and is currently the de facto industry-wide standard for Web service interface definition.

The increasing adoption of web services, however, poses certain problems for network devices that classify network traffic, such as application traffic monitoring devices (e.g., PacketSeeker™ application traffic monitoring appliance offered by Packeteer®, Inc. of Cupertino, Calif.), and application traffic management devices (e.g., PacketShaper® application traffic management appliance offered by Packeteer®, Inc.). Such network devices are typically deployed at strategic points in enterprise networks to monitor data flows traversing, for example, a WAN link. Many such network devices typically classify network traffic based on attributes within IP and TCP headers of the packets corresponding to a data flow. For example, HTTP traffic can often be classified based on the port number (port 80) in the TCP packet header. As discussed in the above-identified patents and patent applications, some traffic classification mechanisms employ rich Layer 7 traffic classification mechanisms. For example, as discussed more fully below, identification of traffic types associated with data flows traversing a WAN link, for example, typically involves the application of matching criteria or rules to the attributes of individual packets against an application signature which may comprise a one to a combination of attributes, such as a protocol identifier (e.g., TCP, HTTP, UDP, MIME types, etc.), a port number, and even an application-specific string of text in the payload of a packet.

The increasing use of Web services makes granular classification of network traffic more difficult, since the data flows corresponding to a variety of different web services applications all use the same standard web services and other network protocols, such as HTTP, SMTP, NNTP, SOAP, XML and the like. For example, a Web service typically allows a consuming application to access the service using one to a plurality of different bindings based on standard network protocols, such as HTTP and SMTP. Accordingly, the packet headers in the messages transmitted to the web service, as well as the packet headers associated with any response, across a wide variety of web services will typically include less meaningful information in the lower layers of the headers associated with the network communication protocol stack. For example, as discussed above, a well-formed SOAP message using an HTTP binding will typically identify port number 80, the well-known port number for HTTP traffic. As a result of this standardization, it will become increasingly difficult to ensure that critical network services are protected and rogue services, that also employ Web service networking protocols, are restricted as the differentiation between services and applications moves up the network communications protocol stack. Moreover, as the information that distinguishes one Web service from another moves up the protocol stack, it becomes more difficult to configure the matching attributes required to classify each Web service.

With the increasing adoption of Web services, as well as other network applications utilizing standard Internet transport protocols for inter-application communication, a more granular identification mechanism is needed to be able to differentiate one application from another and/or differentiate different components (methods/functions) within an application. For example, a stock information Web service might provide methods to 1) get a real-time quote, 2) find a ticker symbol based on a search string, and 3) enter a buy/sell request. Being able to differentiate the network traffic for each of these operations would allow for finer grained data collection and control of this traffic. With a more granular traffic classification mechanism, traffic policies can be configured, for example, to prioritize buy/sell requests so that they are pushed through the network faster than ticker symbol searches.

In light of the foregoing, a need in the art exists for methods, apparatuses and systems that facilitate the classification of web services network traffic for purposes such as monitoring and control of application performance, network utilization, and the like. Embodiments of the present invention substantially fulfill this need.

SUMMARY OF THE INVENTION

The present invention provides methods, apparatuses and systems that facilitate the classification of web services network traffic. In one implementation, the present invention processes interface definitions corresponding to a given Web service to construct a traffic classification configuration for the Web service, including one or more traffic classes and corresponding matching rules or attributes for each traffic class. In one implementation, the present invention automatically creates traffic classes and matching rules that allow for differentiation between the operations supported by a Web service. Implementations of the present invention provide a mechanism allowing for classification of Web services network traffic on a granular basis to enhance network monitoring and analysis tasks, as well as network control functions, such as bandwidth management, security and other functions.

DESCRIPTION OF PREFERRED EMBODIMENT(S)

Figure 1:
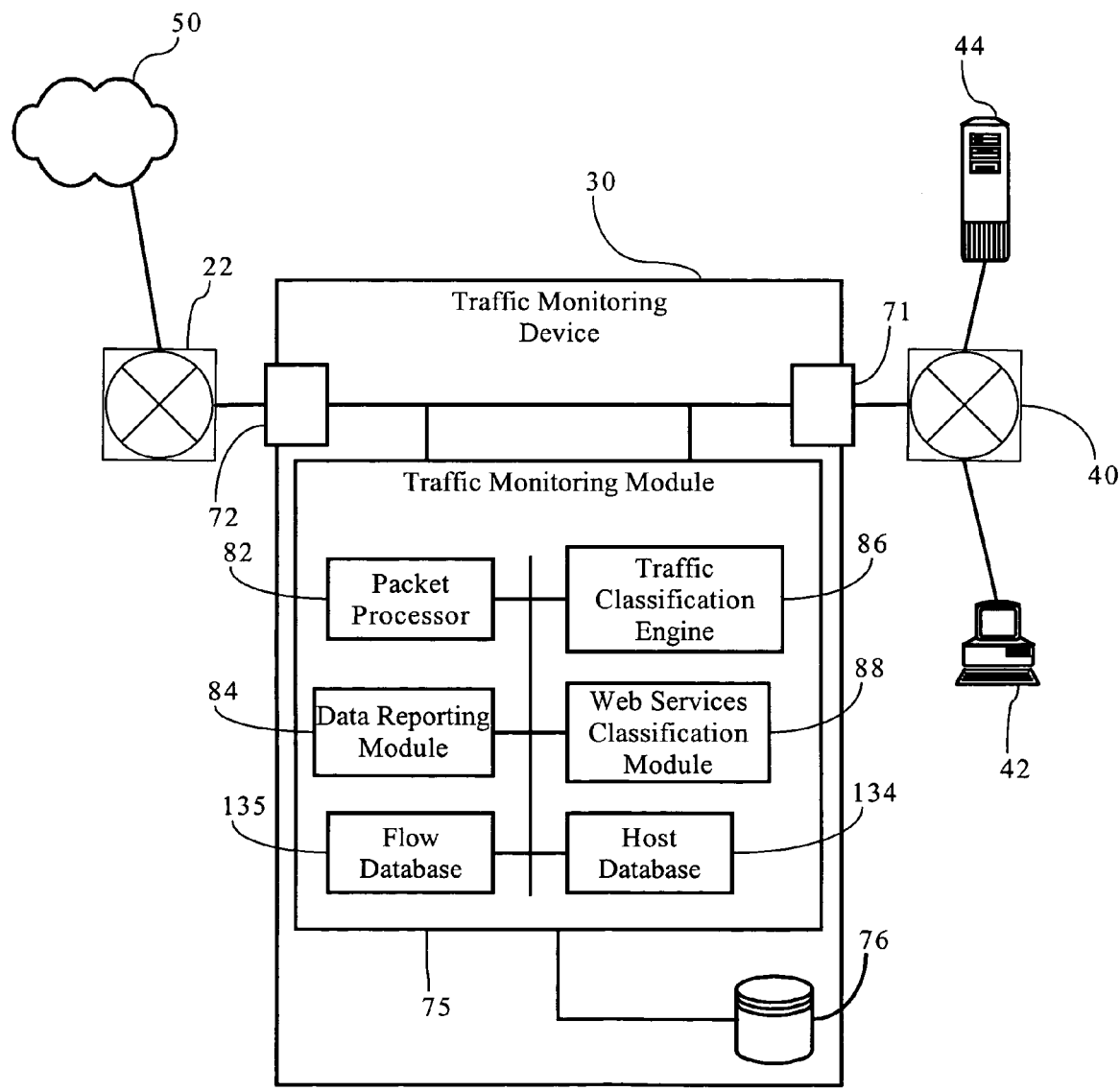
FIG. 1 is a functional block diagram showing a traffic monitoring device according to an embodiment of the present invention.

FIG. 1 illustrates a basic network environment in which an embodiment of the present invention operates. FIG. 1 shows a first network device 40 (such as a hub, switch, router, and/or a variety of combinations of such devices implementing a LAN or WAN) interconnecting two end-systems (here, client computer 42 and server 44). FIG. 1 also provides a second network device 22, such as a router, operably connected to network cloud 50, which in one implementation could be an open, wide-area network. As FIG. 1 shows, traffic monitoring device 30 comprises traffic monitoring module 75, and first and second network interfaces 71, 72, which operably connect traffic monitoring device 30 to the communications path between first network device 40 and second network device 22. Traffic monitoring module 75 generally refers to the functionality implemented by traffic monitoring device 30. In one embodiment, traffic monitoring module 75 is a combination of hardware and software, such as a central processing unit, memory, a system bus, an operating system and one or more software modules implementing the functionality described herein. In one embodiment, traffic monitoring module 75 includes a packet processor 82, a data reporting module 84, a traffic classification engine 86, and a web services classification module 88. In one embodiment, the packet processor 82 is operative to process data packets, such as storing packets in a buffer structure, recognizing new data flows and connections, parsing the data packets for various attributes (such as source and destination addresses, and the like) and maintaining data structures characterizing various attributes of the flows. The traffic classification engine 86, as discussed more fully below, is operative to classify data flows based on one or more attributes associated with the data flows. Data reporting module 84 is operative to monitor and collect various statistics and measurements on a per-traffic-class and aggregate basis. In one implementation, each traffic class is configured with a set of reporting policies that define what statistics, measurements or other values are to be collected and maintained by data reporting module. Web services classification module 88 facilitates the classification of web services network traffic as discussed more fully below.

The functionality of traffic monitoring device 30 can be integrated into a variety of network devices that classify network traffic, such as firewalls, gateways, proxies, packet capture devices (see U.S. application Ser. No. 10/453,345), network traffic monitoring and/or bandwidth management devices, that are typically located at strategic points in computer networks. In one embodiment, first and second network interfaces 71, 72 are implemented as a combination of hardware and software, such as network interface cards and associated software drivers. In addition, the first and second network interfaces 71, 72 can be wired network interfaces, such as Ethernet interfaces, and/or wireless network interfaces, such as 802.11, BlueTooth, satellite-based interfaces, and the like. As FIG. 1 illustrates, traffic monitoring device 30, in one embodiment, includes persistent memory 76, such as a hard disk drive or other suitable memory device, such writable CD, DVD, or tape drives.

Figure 2:
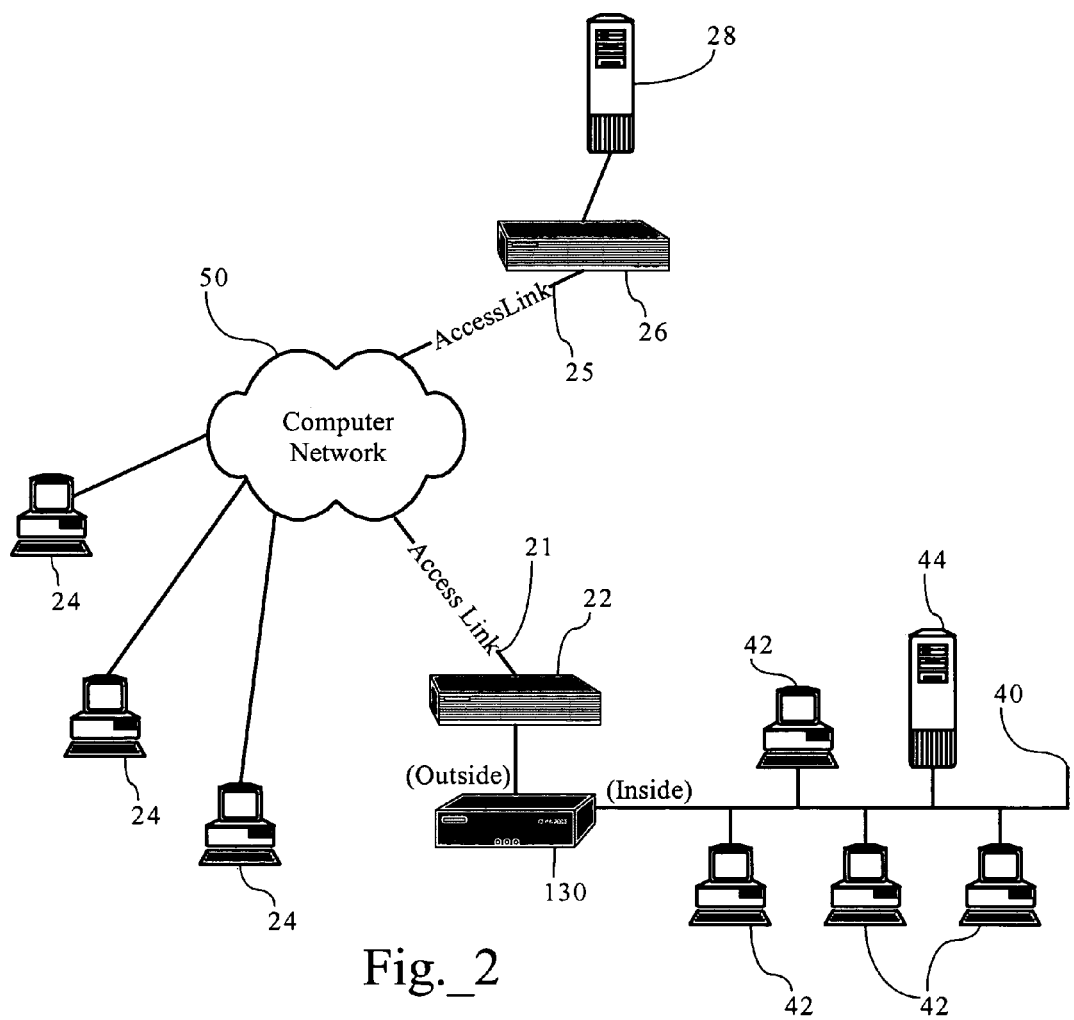
FIG. 2 is a functional block diagram illustrating a computer network environment including a bandwidth management device according to an embodiment of the present invention.

As FIGS. 1 and 2 show, the traffic monitoring device 30 (or bandwidth management device 130), in one embodiment, is disposed on the link between a local area network 40 and router 22. In other embodiments, multiple traffic monitoring devices can be disposed at strategic points in a given network infrastructure to achieve various objectives. In addition, traffic monitoring device 30 need not be directly connected to the link between two network devices, but may also be connected to a mirror port. In addition, the traffic monitoring functionality described herein may be deployed in multiple network devices and used in redundant network topologies by integrating the network traffic synchronization functionality described in U.S. application Ser. No. 10/611,573, incorporated by reference above.

A. Network Traffic Monitoring and Web Services Network Traffic Classification

As discussed herein, traffic monitoring device 30 is operative to detect or recognize flows between end systems or hosts, and classify the data flows based on one or more flow attributes. Traffic monitoring device 30 may also monitor and store one or more measurement variables, and other statistics, on an aggregate and/or per-traffic-class basis. As discussed below, traffic monitoring device 30, in one implementation, is also operative to track the activity of web services network traffic and report on the web services traffic types traversing the network.

A.1. Packet Processing

In one embodiment, when packet processor 82 encounters a new data flow it stores the source and destination IP addresses contained in the packet headers in host database 134. Packet processor 82 further constructs a control block (flow) object including attributes characterizing a specific flow between two end systems. In one embodiment, packet processor 82 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix database identifiers, and the like. Packet processor 82, in one embodiment, reserves memory space in the dynamic memory pool for storing such variably-sized attribute information as flows traverse traffic monitoring device 30. Packet processor 82 also stores received packets in a buffer structure for processing. In one embodiment, the packets are stored in the buffer structure with a wrapper including various information fields, such as the time the packet was received, the packet flow direction (inbound or outbound), and a pointer to the control block object corresponding to the flow of which the packet is a part.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. Nos. 6,046,980 and 6,591,299, as well as others incorporated by reference herein, disclose classification of data flows for use in a packet-based communications environment. FIG. 2 illustrates the concept associated with inside and outside addresses. As discussed above, in one embodiment, a flow specification object includes an "inside" and "outside" address relative to traffic monitoring device 130. See FIG. 2. For a TCP/IP packet, packet processor 82 can compute the inside and outside addresses based on the source and destination network addresses of the packet and the direction of the packet flow.

In one embodiment, packet processor 82 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes further include at least one traffic class identifier (or pointer(s) thereto) associated with the data flow, as well as policy parameters (or pointers thereto) corresponding to the identified traffic class.

In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 82 hashes the values identified above and scans the hash table for a matching entry. If one exists, packet processor 82 associates the pointer to the corresponding control block object with the data flow.

To allow for identification of service types (e.g., FTP, HTTP, etc.), packet processor 82, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When traffic monitoring device 30 encounters a new flow, packet processor 82 analyzes the data flow against the service attributes in the services table to identify a service ID corresponding to the flow. In one embodiment, packet processor 82 may identify more than one service ID associated with the flow. In this instance, packet processor 82 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor 82 associates the flow with the most specific service ID. A traffic class maintained by traffic classification engine 86 may be configured to include matching rules based on the service IDs in the services table. For example, a matching rule directed to HTTP traffic may simply refer to the corresponding service ID, as opposed to the individual attributes that packet processor 82 uses to initially identify the service.

In one embodiment, when packet processor 82 inspects a flow it may detect information relating to a second, subsequent flow (e.g., an initial FTP command connection being the harbinger of a subsequent data connection, etc.). Packet processor 82, in response to such flows populates a remembrance table with attributes gleaned from the first flow, such as IP addresses of the connection end points, port numbers, and the like. Packet processor 82 scans attributes of subsequent flows against the remembrance table to potentially associate the subsequent flow with the first flow and to assist in identification of the second flow.

A.2. Traffic Classification

A traffic class comprises a set of matching rules or attributes allowing for logical grouping of data flows that share the same characteristic or set of characteristics—e.g., a service ID or type (see Section A.1., above), a specific application, protocol, IP address, MAC address, port, subnet, a text string, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, traffic monitoring device 30 includes functionality allowing for classification of network traffic based on information from layers 2 to 7 of the OSI reference model. Traffic monitoring device 30 can be configured to include matching rules that define a plurality of network applications commonly found in enterprise networks, such as database applications, Citrix® flows, ERP applications, HTTP traffic, SOAP traffic, and the like.

In one embodiment, traffic monitoring device 30 is configured to include a predefined set of traffic classes based upon a knowledge base gleaned from observation of common or known traffic types on current networks. As discussed more fully below, these traffic classes can be added to traffic classification engine 86 as data flows associated with these traffic classes are encountered. Traffic monitoring device 30, in one embodiment, also allows an administrator to manually create a traffic class by specifying a set of matching attributes. As discussed above, administrator interface 150, in one embodiment, allows for selection of a traffic class and the configuration of one or more policies for the selected traffic class. In the context of traffic monitoring device, administrator interface 150 allows a network administrator to specify which reporting options or parameters to track for a given traffic class. Administrator interface 150, in one embodiment, also allows for the selection and arrangement of traffic classes into hierarchical reference trees.

Traffic classification engine 86, in one implementation, stores traffic classes associated with data flows that traverse access link 21. Traffic classification engine 86, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". In one embodiment, administrator interface 150 displays the traffic class tree and allows for selection of a traffic class and the configuration of policies for that traffic class, such as a reporting policy. Administrator interface 150 also allows for the arrangement of traffic classes into a hierarchical classification tree. Traffic monitoring device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a reporting policy), a pointer field reserved for pointers to one to a plurality of child traffic classes. In one embodiment, traffic classification engine 86 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

As with other traffic types, web services network traffic may be classified based on a variety of attributes. For example, web services network traffic adhering to standard protocols, such as SOAP, can be identified based on various attributes of the protocol. For example, web service network traffic in the aggregate can be identified by matching against various elements of message headers identifying for example, the messaging protocol (e.g., SOAP), the binding (e.g., HTTP, SMTP, etc.), host and URI information, as well as service operation identifiers in the message payload. Accordingly, traffic classification engine 86 can be configured to classify web services network traffic on an aggregate basis by configuring matching rules based on known web services network protocols. Traffic classification engine 86 can also be configured to differentiate between web services based on host and URI information in SOAP (or other protocol) message headers. Furthermore, traffic classification engine 86 can also be configured to differentiate between operations supported by a given web service based on calls to the operations in message payloads, as discussed more fully below. As discussed more fully below, web services classification module 88, in one implementation, can parse an interface definition associated with a given web service to automatically generate at least one traffic class and the matching attributes and rules corresponding to the traffic class.

A.2.a. Automatic Traffic Discovery

As discussed above, a traffic discovery module (not shown), in one implementation, analyzes data flows for which no matching traffic class was found in traffic classification engine 86. The traffic discovery module, in one embodiment, is operative to apply predefined sets of matching rules to identify a traffic class corresponding to non-matching data flows. In one implementation, the traffic discovery module operates on data flows classified as either /Inbound/Default or Outbound/Default. In one embodiment, the traffic discovery module is configured to include a predefined set of traffic classes based upon a knowledge base gleaned from observation of common or known traffic types on current networks. In one embodiment, the traffic discovery module creates traffic classes automatically in response to data flows traversing traffic monitoring device 30 and stores such traffic classes in traffic classification engine 86. Automatic traffic classification is disclosed in U.S. Pat. Nos. 6,412,000, 6,457,051, and 6,591,299, which are incorporated herein by reference.

As discussed above, the traffic discovery module applies one or more traffic discovery thresholds when deciding whether to present or add newly discovered traffic classes. In one embodiment, the traffic discovery module must detect a minimum number of data flows within a predefined period for a given traffic type before it creates a traffic class in traffic classification engine 86. In one embodiment, auto-discovered traffic classes are automatically assigned predefined traffic management policies. U.S. patent application Ser. No. 09/198,051, incorporated by reference herein, discloses automatic assignment of traffic policies for discovered traffic classes.

A.3. Data Reporting Module

As discussed above, data reporting module 84 is operative to process packets traversing traffic monitoring device 30 and collect various statistics and measurements on a per-traffic-class and aggregate basis. In one implementation, data reporting module 84 is operative to identify the reporting policies of the traffic class to which a packet corresponds and apply the reporting policies to that traffic class. In one implementation, data reporting module 84 maintains all possible measurements and statistics for a given traffic class as a default configuration. In one implementation, data reporting module 84 maintains data associated with the operation of traffic monitoring device 30 and access link 21, including data allowing for measurement of bandwidth utilization across access link 21 with respect to a plurality of bandwidth utilization and other network statistics. In one implementation, data reporting module 84 is operative to record or maintain numeric totals of a particular measurement variable at periodic intervals on a traffic classification basis. For example, data reporting module 84 monitors the number of inbound and outbound packets, the number of flows, peak and average rates, as well as the number of bytes, traversing traffic monitoring device 30 on an aggregate (access link), partition, and/or traffic class level. Other network statistics can include the number of TCP packets, the number of retransmitted TCP packets, the peak number of concurrently active TCP flows or other connections, etc. Data reporting module 84 further maintains data relating to traffic classes, such as, for a given traffic class: the packet count in the traffic class, the TCP data packet count in the class, the TCP retransmit packet count in the class, and the peak number of active TCP flows in the class, as well as a "class hits" count characterizing the number of flows that were matched to a given traffic class. Of course, data reporting module 84 can be configured to record and maintain a variety of network utilization and performance related data. For example, data reporting module 84 can be configured to measure and record packet arrival times associated with various data flows in order to compute response time measurements, or network delay measurements, for traffic classes. U.S. application Ser. No. 09/710,442 discloses methods and systems for monitoring network delay on an application-level basis attributable to different networks by monitoring data flows at a demarcation point between the two networks.

In one embodiment, data reporting module 84 monitors operation of traffic monitoring device 30 and maintains values (e.g., packet counts, peak bandwidth utilization values, and other quantities) for various network operation, utilization and performance statistics. In one embodiment, data reporting module 84 maintains such values in volatile memory and, at periodic intervals, stores the data in persistent memory, such as a hard drive, with a time stamp and clears the network statistic values in the volatile memory space. As discussed above, network statistic data can be stored in association with identifiers for access link 21, as well as for various traffic classes associated with the current configuration of traffic monitoring device 30. In one embodiment, data reporting module 84 stores network statistic data in persistent memory at one-minute intervals; however, other suitable time intervals can be chosen as a matter of engineering design or administrative need. In addition, the persistent memory, in one embodiment, includes sufficient capacity to store a large amount of network management data, such as data for a period of 24, 48, or 72 hours.

In one embodiment, the time interval at which data reporting module 84 stores network management data in persistent memory is a configurable parameter. Additionally, data reporting module 84 includes APIs allowing other modules to access the raw measurement data. In one embodiment, data reporting module 84 includes APIs and associated functionality that aggregates raw measurement data over specified time intervals (e.g., the last hour, 15 minutes, day, etc.).

A.4. Web Services Classification Module

Web services classification module 88, in one implementation, performs various operations related to the classification of web services network traffic. Web services classification module 88, for example, is operative to monitor the packet path associated with traffic monitoring device 30 to track the frequency of, or other usage statistics associated with, web services network traffic. In addition, web services classification module 88 is also operative to assist network administrators or other end users to configure traffic classification engine 86 to classify web services network traffic.

Figure 4:
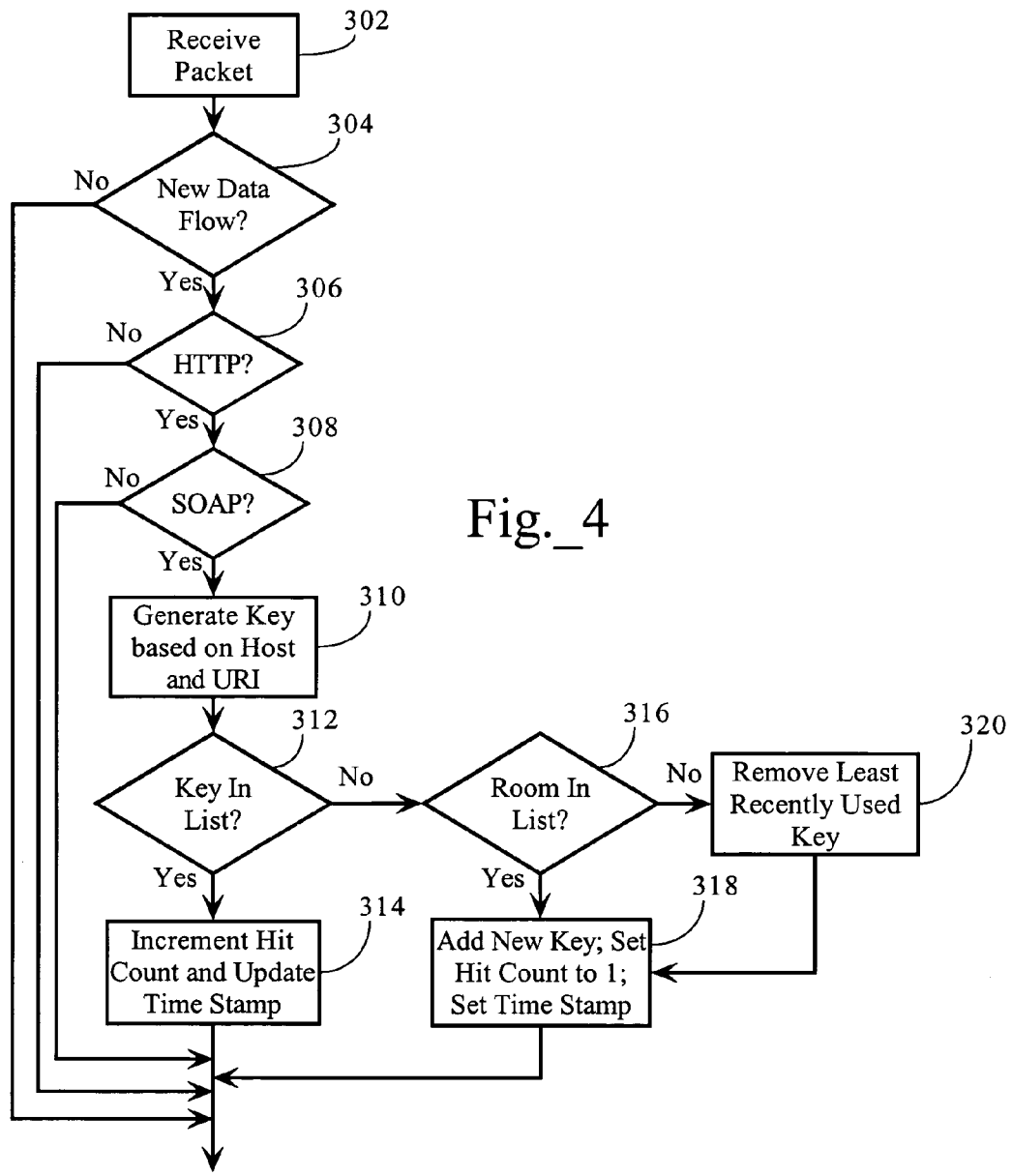
FIG. 4 is a flow chart diagram providing a method, according to an embodiment of the present invention, directed to monitoring web services network traffic.

FIG. 4 illustrates a method, according to an implementation of the present invention, directed to tracking the number of SOAP transactions, using HTTP bindings, corresponding to the various web services network traffic that traverses traffic monitoring device 30. As FIG. 4 illustrates, Web services classification module 88 maintains a hash table of web services detected in the data flows traversing traffic monitoring device 30 and increments a count corresponding to a given web service when a new SOAP transaction is detected. In the implementation according to FIG. 4, web services classification module 88 monitors the packet path to detect new data flows. In another implementation, packet processor 82 detects the new data flows and upon receipt of the first data packet(s) in the flow, passes it to web services classification module 88 for inspection and possible tracking.

Specifically, in one implementation, when a packet is received (302), Web services classification module 88 determines whether the packet represents a new data flow, such as the first packet of a new TCP connection (e.g., SYN, SYN-ACK, or ACK packets) (304). If the packet represents a new data flow, Web services classification module 88 waits for the first data packet in the flow and inspects the packet, or subsequent packets, to identify a HTTP header (306) and whether the packet(s) further contains SOAP headers or other elements (308). If both conditions are true, Web services classification module 88 generates a key based on the host and URI identified in the HTTP header associated with the SOAP message (310). In one implementation, the key is generated by applying a hashing function to the host name and URI pair identified in the SOAP message. Web services classification module 88 then determines whether the generated key already appears in the list of web services (312). If so, Web services classification module 88 increments the hit (transaction) count associated with the identified web service and updates the time stamp to the time the packet was received (314). As FIG. 4 illustrates, the tracking list is maintained in a finite memory space. Accordingly, a least-recently used (LRU) process is implemented to manage new entries into the list. In one implementation, if the generated key is not in the list, Web services classification module 88 determines whether the tracking list is full (316). If so, Web services classification module 88 removes the least recently used key (determined relative to the time stamp associated with the key) (320), and adds the new key to the list, setting the hit (transaction) count to 1 and setting the time stamp to the time the packet was received.

A variety of configurations are possible. For example, Web services classification module 88 could maintain a separate tracking list where inside hosts (see above) are the servers in the transaction, and another tracking list where the inside hosts are the clients in the transaction. In addition, the tracking list could also count the number of web services transactions using different bindings, such as SMTP, as well as other web services network protocols. Furthermore, the tracking list can be applied on a more granular basis to track transactions associated with different operations supported by the web services. This can be accomplished by inspecting the data in the SOAP message payloads for operation identifiers.

In any of these configurations, the tracking lists maintained by Web services classification module 88 can be used in a variety of manners. For example, a network administrator may sort the list based on transaction count to identify the most active web services whose data flows traverse traffic monitoring device 30. In addition, a network administrator may select one or more of the identified web services and configure traffic classification engine 86 to classify the web services network traffic, and to configure one or more operational policies to be applied to the selected web services network classes, as discussed more fully herein. Still further, Web services classification module 88 can be configured to transmit alerts, such as SNMP traps, when the transaction count corresponding to a given web service exceeds a threshold in a given time interval.

Figure 5:
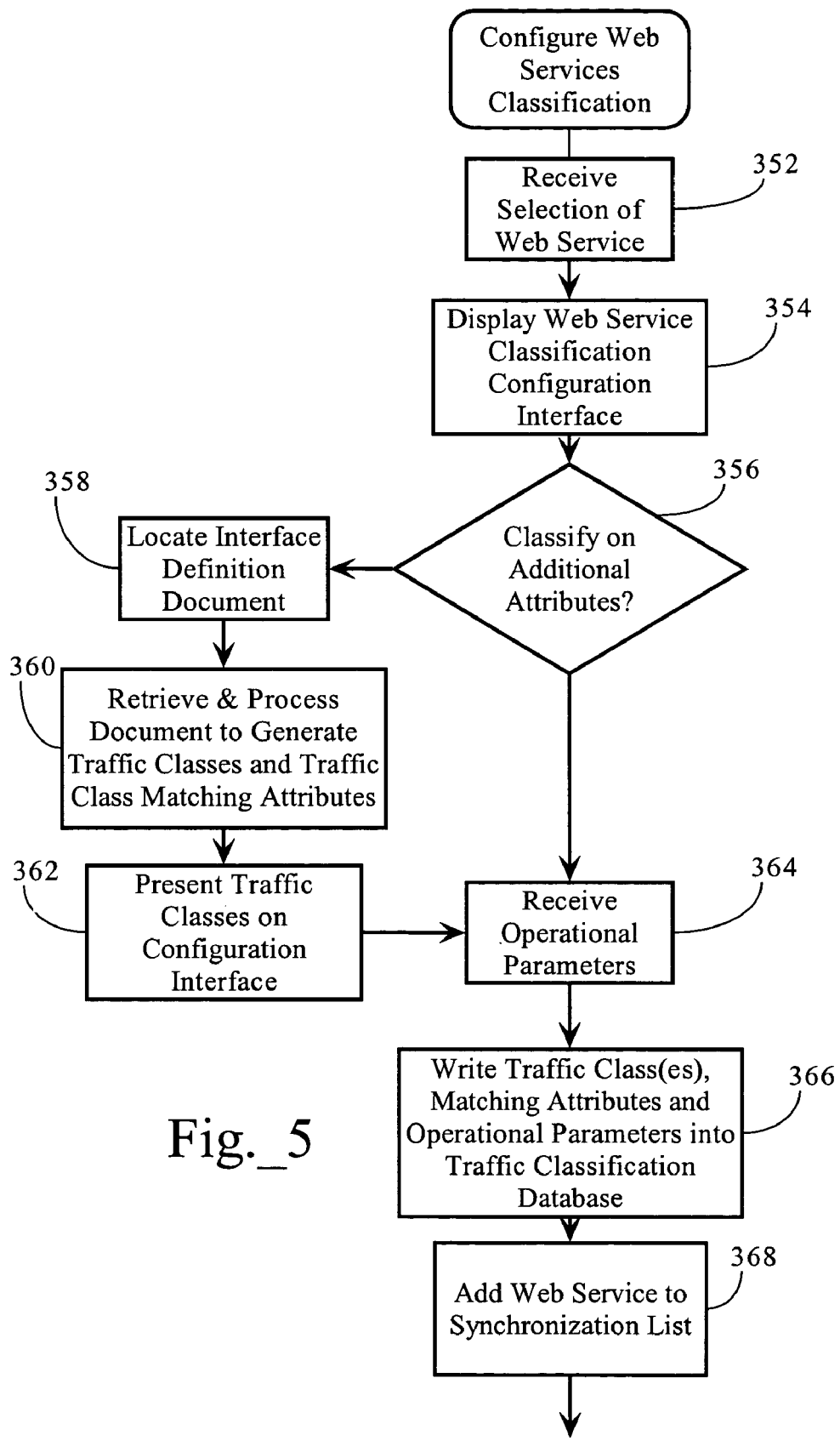
FIG. 5 is a flow chart diagram illustrating a method, according to an implementation of the present invention, directed to creating traffic classes corresponding to web services based on attributes set forth in an interface definition document.

FIG. 5 illustrates a configuration process flow, according to one implementation of the present invention, supported by Web services classification module 88. As discussed above, a network administrator may access administrator interface 150 to view the web service tracking list discussed above. The network administrator may decide that traffic classification engine 86 should be configured to classify one or more selected web services identified on the tracking list for purposes of obtaining additional reported information. In one implementation, when an end user selects a web service from the tracking list, Web services classification module 88 receives a command or request identifying a selected web service (352). Web services classification module 88, in one implementation, displays a configuration interface that facilitates configuration of traffic classification engine 86 to included the identified web service (354). In one implementation, the configuration interface allows the end user the option to create traffic classes based on one or more attributes of the identified web service, such as the bindings or operations supported by the web service. If the end user opts to classify the web service based on additional attributes (356), Web services classification module 88 prompts the user for the host name and path of the interface definition document corresponding to the identified web service (358). For example, the end user can specify the host address and path to the interface definition document in a UDDI or other web services directory. Of course, the end user may also specify a location of a copy of the interface definition document stored on a local hard drive or other file space. With the information provided by the user, Web services classification module 88 retrieves and processes the interface definition document based on the web services attributes specified by the user to generate traffic classes corresponding to the web services attributes and corresponding matching rules (360). In one implementation, if an interface definition for the selected Web service is not available, Web services classification module 88 uses the host name and URI pair, as well as other protocol attributes (such as operation names) detected during the tracking process described above, to create matching rules. In other implementations, web services classification module 88 allows the end user the option to create matching rules based on the information obtained in the tracking process discussed above, or to create matching rules by receiving and processing an interface definition document corresponding to the web service.

Web services classification module 88 then presents the traffic classes corresponding to the web service in a configuration interface (362). As FIG. 5 illustrates, the configuration interface, in one implementation, allows the end user to select a traffic class and specify operational parameters for the selected traffic class. In the context of traffic monitoring device 30, the operational parameters may be reporting policies that specify the measurements or other statistics that are gathered by data reporting module 84. For example, an end user may select a given traffic class and configure a reporting policy that causes data reporting module 84 to track the aggregate bytes in the data flows corresponding to the traffic class. As discussed more fully below, the operational parameters may include other policy types, such as bandwidth utilization controls, depending on the functionality associated with the network device. When Web services classification module 88 receives the operational parameters (364), it writes the traffic class identifiers, matching attributes and operational parameters into traffic classification engine 86 (366). In one implementation, Web services classification module 88 also adds the web service to a synchronization list (see below) that Web services classification module 88 consults to periodically synchronize the configuration of traffic classification engine 86 with the most current version of the interface definitions associated with the web services in the database (368).

As one skilled in the art will recognize, Web services classification module 88 can be configured to process a variety of interface definition types, such as Web Services Description Language (WSDL), Interface Definition Language (IDL), Microsoft Interface Definition Language (MIDL), and the like. For didactic purposes, the Appendix provides an exemplary interface definition document formatted according to the WSDL standard. In addition, the following pseudocode illustrates a method, according to an implementation of the present invention, directed to processing an interface definition document to identify the operations associated with a given web service, identify the values of selected attribute types corresponding to the web service, and create traffic classes including matching rules based on the identified attribute values.

fic class SERVICE_1 includes matching rules specifying the protocol or binding supported by the web service, and the target URI. As the foregoing illustrates, Web services classification module 88 can optionally identify the individual

---

1. For each <service> element
    1.1 Extract the "name" element and save in SERVICE_NAME
    1.2 For each <port> (<endpoint> in WSDL 1.2) element within the service
        1.2.1    Extract the "binding" QName
        1.2.2    Extract the URI and save in TARGET_URI
        1.2.3    Locate the "binding" by Qname
            1.2.3.1    Extract the "transport" attribute to determine protocol (HTTP,
                      SMTP, . . . ) and save in PROTOCOL
            /* now configure network traffic classification device*/
            1.2.3.2    Create a traffic class named SERVICE_NAME with matching
                    rules:
                  1.2.3.2.1    Network protocol is of type PROTOCOL
                  1.2.3.2.2    And, request message is destined for TARGET_URI
            *(optional)Do more processing to differentiate specific operations within
            service
            1.2.3.3    Extract the "type" QName attribute of the "binding"
            1.2.3.4    Locate <portType> (<interface> in WSDL 1.2) element by QName
                  found in 1.2.3.3
                1.2.3.4.1    For each <operation> element
                      1.2.3.4.1.1    Extract the "name" attribute and save in
                              OPERATION
                      1.2.3.4.1.2    Create a sub-class of the one created in 1.2.3.2
                              where the body of a SOAP message either
                              contains the invocation of OPERATION or is
                              in response to the invocation of OPERATION.

---

Given the process set forth above, assume for didactic purposes, a web service identified as "SERVICE_1" that supports three operations OPERATION_1, OPERATION_2, and OPERATION_3. In one implementation, Web services classification module 88 consumes the WSDL document, as set forth above, to create a parent traffic class (SERVICE_1), and three child traffic classes (OPERATION_1, OPERATION_2, and OPERATION_3). In one implementation, the parent trafoperations and create matching rules based on the operation names or identifiers in the interface definition document.

For didactic purposes the following illustrates the processing of the interface definition document in the Appendix according to the method set forth above.

---

1. Found <service> at line 58
    1.1 Extract name attribute: SERVICE_NAME = "PriceCheckService"
    1.2 Found <port> at line 60
        1.2.1    Found "binding" attribute "PriceCheckSoapBinding"
        1.2.2    Found address location: TARGET_URI =
                "http://webservice.com/pricecheck"
        1.2.3    Found <binding> named "PriceCheckSoapBinding" at line 45
            1.2.3.1    "transport" attribute gives us PROTOCOL =
                      http://schemas.xmlsoap.org/soap/http
            1.2.3.2    Now know that SOAP traffic delivered via HTTP protocol to
                      and from URL http://webservice.com/pricecheck/ is
                      "PriceCheckService" traffic. Build appropriate rules on
                      classification device to collect reporting data and/or apply
                      controls to this traffic.
            1.2.3.3    Extract the "type" attribute "PriceCheckPortType" on line 45
            1.2.3.4    Find <portType> element named "PriceCheckPortType"
                  at line 38.
                1.2.3.4.1    Found <operation> at line 39
                      1.2.3.4.1.1    Extract "name" attribute: "GetLastTradePrice"
                      1.2.3.4.1.2    Now know that if body of SOAP message
                              invokes "GetLastTradePrice" operation then
                              this is "PriceCheckService::GetLastTradePrice"
                              traffic. Build appropriate rules on classification
                              device to collect reporting data and/or apply
                              controls to this traffic.
                1.2.3.4.2    No more <operation> elements
            1.2.3.5    No more <binding> elements found
        1.2.4    No more <port> elements found
    1.3 No more <service> elements found
2   Done.

As illustrated above, Web services classification module 88 processes the interface definition document and, in one implementation, presents a configuration interface illustrating the hierarchical traffic classification set forth below, where "WebServices" is the parent traffic class for all web services traffic classes.

WebServices
      PriceCheckService
         GetTradePrice

As discussed above, the configuration interface also allows the user to select a traffic class such as GetTradePrice, and configure one or more operational parameters. When the network administrator has completed the configuration, Web services classification module 88 writes the traffic classes, including the corresponding matching rules and operational parameters, in traffic classification database. Furthermore, one skilled in the art will recognize that a variety of implementations are possible. For example, Web services classification module 88 can be configured to create child traffic classes based on the different binding types associated with a given web service.

In one implementation, the configuration interface associated with Web services classification module 88 also allows end users to specify the location of the interface definition document corresponding to the web services in a UDDI repository, for example, for the purposes of automatically synchronizing the traffic classification configuration associated with the web service with the most current version of the corresponding interface definition document. Typically, WSDL and/or other interface definition files are available as web resources using a corresponding URI. As WSDL files are processed their URIs can be maintained by the classification device and automatically synchronized on a configurable interval (e.g., 12 hours, 24 hours, one week, etc.). In one implementation, the synchronization interval can be configured individually for each web service. In one implementation, Web services classification module 88 periodically performs the synchronization by sending an "If-modified-since" http request to the URI corresponding to the desired WSDL (or other interface definition) file. In one implementation, the If-modified-since date is the date stamp of the last successful synchronization. If the response to the request is a "304 Not Modified" then Web services classification module 88 updates the date stamp to the current date. If the response is a "200 OK" response, Web services classification module 88 then knows that the WSDL file may have changed. Accordingly, Web services classification module 88 re-processes the WSDL file to determine whether it is accurately represented by the classification rules, and updates or remove rules as necessary. If new operations or other traffic classes are identified, Web services classification module 88 notifies the network administrator to allow for possible configuration of operational policies.

A.5. Operation

Figure 6:
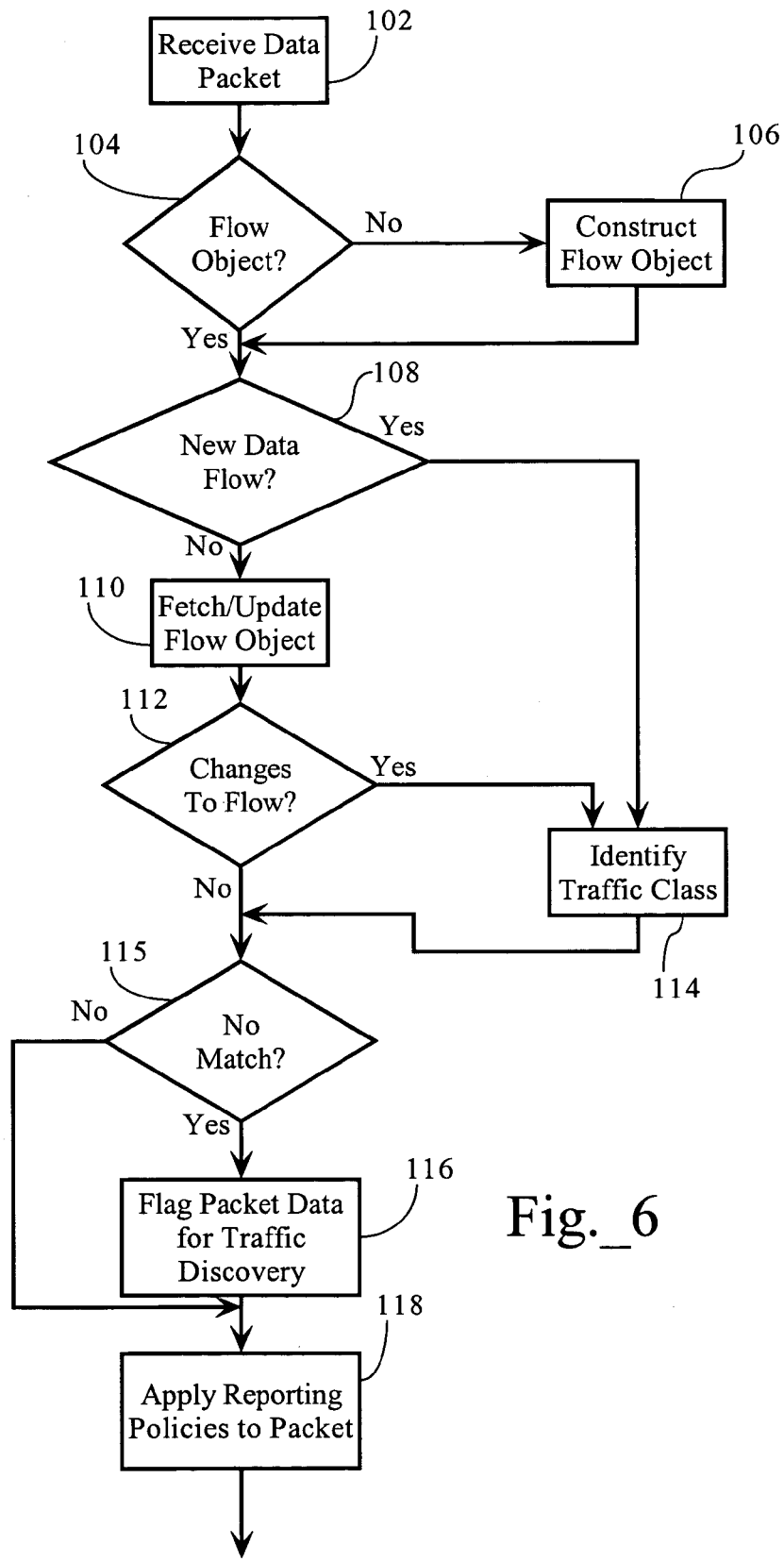
FIG. 6 is a flow chart diagram providing a method, according to an implementation of the present invention, directed to enforcing reporting or monitoring policies on data flows.

FIG. 6 illustrates a method, according to an embodiment of the present invention, directed to a flow-aware process that classifies flows and maintains one or more measurement or other reporting variables based on the reporting policy(ies) associated with the identified traffic class. As FIG. 6 illustrates, a packet processor 82 receives a data packet (102) and determines whether a flow object has already been created for the flow to which the data packet is a part (104). A flow object, in one implementation, is a data structure including fields whose values characterize various attributes of the flow, including source and destination IP addresses, port numbers, traffic class identifiers and the like. A flow object can also include other attributes, such as packet count, byte count, first packet time, last packet time, etc. If a flow object is not found, packet processor 82 constructs a new flow object (106). Packet processor 82 then determines whether the received packet is part of an existing flow or a new data flow (108). In one embodiment, flows are generally TCP and UDP flows. However, any suitable transport layer flow can be recognized and detected. In one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes.

In addition, methods for determining new data flows and assigning packets to existing data flows are well known in the art and also depend on the particular transport layer protocol employed. For a TCP flow, packet processor 82 can determine a new data flow by detecting SYN and/or SYN/ACK packets. However, a new data flow can simply be a data flow for which there is no corresponding flow object. For example, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another implementation, a background and/or separate process can periodically compare the last packet times associated with a flow to a threshold period of time and deem the flow terminated if the last packet time is beyond the threshold period of time.

If the packet is part of an existing flow, the packet processor 82 associates the packet with the corresponding flow object and updates flow object attributes as required (110). For example, the packet processor 82, in one embodiment, increments the packet count associated with the flow (116). If the packet represents a new data flow, traffic classification engine 86 operates on the flow object and, potentially, attributes of the packet and other packets associated with the flow to determine a traffic type and/or traffic class associated with the flow (114). In one embodiment, the packet (or a pointer to the packet stored in a buffer structure) and the flow object (or a pointer thereto) is passed to the traffic classification engine 86 to determine a traffic class. As discussed in more detail below, identification of a traffic class or type can employ information gleaned from Layers 2 thru 7 of the OSI reference model. In addition, as discussed above, traffic classification engine 86 as part of its classification functionality applies the matching attributes obtained from the processing of various interface web services definition documents (see above) to determine whether the packet or data flow corresponds to a web service. The determination of traffic classes is discussed in more detail below at Section A.2, above. Similarly, if the packet represents a change to the data flow (112), packet processor 82 passes the packet and flow object to the traffic classification engine 86 to determine the traffic class. As FIG. 6 shows, if the data flow does not match an existing traffic class (115), packet processor 82 or traffic classification engine 86 flags the packet for traffic discovery (116). In one embodiment, a data flow that does not match an existing traffic class is classified in the default traffic class.

As FIG. 6 illustrates, data reporting module 84 then applies one or more reporting policies to the packet, or the flow specification object associated with the packet, that defines what measurements or other statistics are to be collected and recorded, such as packet count, byte count, last packet time and the like (118). As discussed herein, traffic monitoring device 30 may perform other operations, such as firewall or gateway operations, packet capture operations, and/or bandwidth management functions. As discussed above, Web services classification module 88, in one implementation, operates concurrently with the processing of data flows as described above to monitor web services network traffic traversing traffic monitoring device, and to periodically synchronize traffic classification engine 86 with the latest versions of the various interface definition documents corresponding to the web services identified in the database.

B. Integration of Behavior Pattern Matching into Bandwidth Management Devices

As discussed above, the enhanced traffic classification functionality described above, in one embodiment, can be integrated into a bandwidth management device 130 operative to manage data flows traversing access link 21. The above-identified, commonly-owned patents and patent applications disclose the general functionality and operation of bandwidth management devices. FIG. 2 sets forth a packet-based computer network environment including a bandwidth management device 130. As FIG. 2 shows, local area computer network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and local area network 40. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations or routing nodes. Bandwidth management device 130 is provided between router 22 and local area computer network 40. Bandwidth management device 130 is operative to classify data flows and, depending on the classification, enforce respective bandwidth utilization controls on the data flows to control bandwidth utilization across and optimize network application performance across access link 21.

Figure 3:
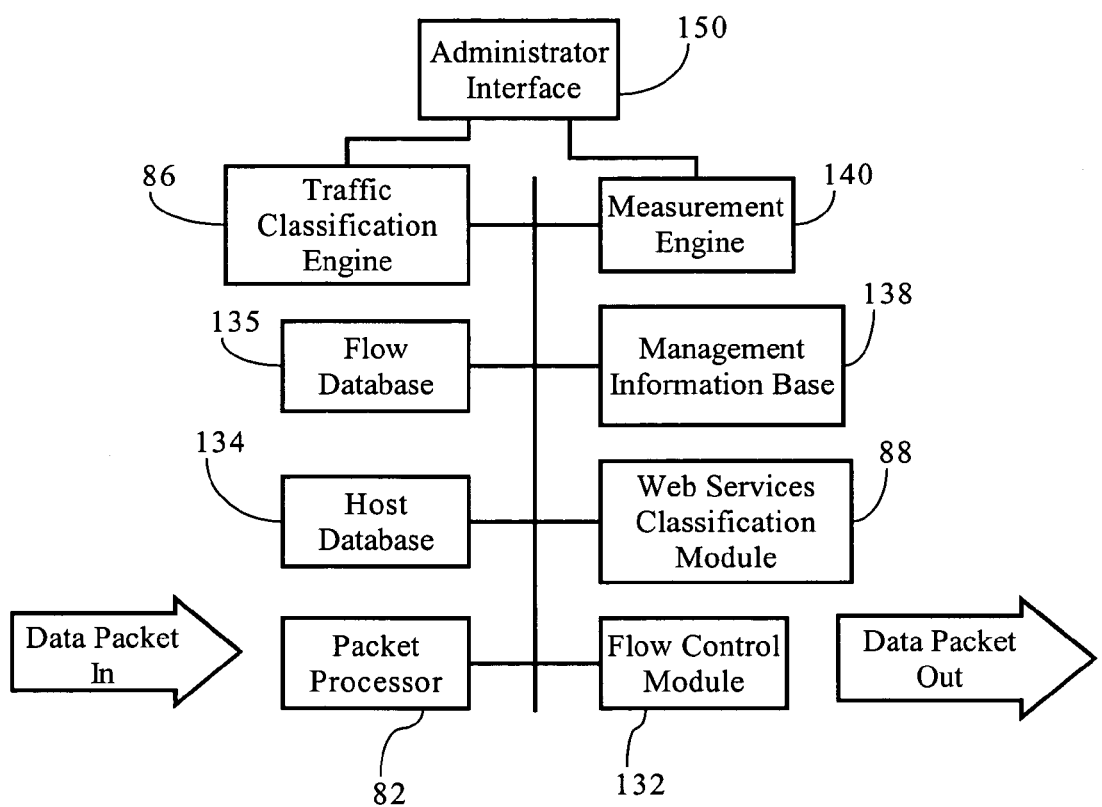
FIG. 3 is a functional block diagram setting forth the functionality in a bandwidth management device according to an embodiment of the present invention.

FIG. 3 is a block diagram illustrating functionality, according to one embodiment of the present invention, included in bandwidth management device 130. In one embodiment, bandwidth management device 130 comprises packet processor 82, flow control module 132, measurement engine 140, traffic classification engine 86, management information base (MIB) 138, traffic discovery module 139, and administrator interface 150. As discussed above, packet processor 82 is operative to detect new data flows and construct data structures including attributes characterizing the data flow. Flow control module 132 is operative to enforce bandwidth utilization controls on data flows traversing bandwidth management device 130. Traffic classification engine 86 is operative to analyze data flow attributes and identify traffic classes corresponding to the data flows, as discussed more fully below. In one embodiment, traffic classification engine 86 stores traffic classes, in association with pointers to bandwidth utilization controls or pointers to data structures defining such bandwidth utilization controls. Management information base 138 is a database of standard and extended network objects related to the operation of bandwidth management device 130. Measurement engine 140 maintains measurement data relating to operation of bandwidth management device 130 to allow for monitoring of bandwidth utilization across access link 21 with respect to a plurality of bandwidth utilization and other network statistics on an aggregate and/or per-traffic-class level. Bandwidth management device 130, in one embodiment, further includes a persistent data store (not shown), such as a hard disk drive, for non-volatile storage of data.

Administrator interface 150 facilitates the configuration of bandwidth management device 130 to adjust or change operational and configuration parameters associated with the device. For example, administrator interface 150 allows administrators to select identified traffic classes and associate them with bandwidth utilization controls (e.g., a partition, a policy, etc.), and other policy types, such as reporting policies. Administrator interface 150 also displays various views associated with a hierarchical traffic classification scheme and allows administrators to configure or revise the hierarchical traffic classification scheme. Administrator interface 150 can be a command line interface or a graphical user interface accessible, for example, through a conventional browser on client device 42.

Packet processor 82, traffic classification engine 86, and Web services classification module 88 operate substantially similar to the corresponding components and modules of traffic monitoring device 30, discussed above. Accordingly, the following provides a description of the operation, according to one implementation, of flow control module 132.

B.1. Flow Control Module

As discussed above, flow control module 132 enforces bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

B.1.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

B.1.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

B.2. Measurement Engine

As discussed above, measurement engine 140 maintains data associated with the operation of bandwidth management device 130 and access link 21, including data allowing for measurement of bandwidth utilization across access link 21 with respect to a plurality of bandwidth utilization and other network statistics. In one implementation, measurement engine 140 is operative to record or maintain numeric totals of a particular measurement variable at periodic intervals on a traffic classification basis. For example, measurement engine 140 monitors the number of inbound and outbound packets, the number of flows, peak and average rates, as well as the number of bytes, traversing bandwidth management device 130 on an aggregate (access link), partition, and/or traffic class level. Other network statistics can include the number of TCP packets, the number of retransmitted TCP packets, the peak number of concurrently active TCP flows or other connections, etc. Measurement engine 140 also maintains data relating to operation of bandwidth management device 130, such as the number of partitions, the byte count in a given partition, the packet count in a given partition, the TCP data packet count in a given partition, the TCP retransmit packet count in a given partition, the TCP tossed retransmit packet count in a given partition, the peak number of active TCP flows in the partition, the total time in seconds spent over the partition size for the partition. Measurement engine 140 further maintains data relating to traffic classes, such as, for a given traffic class: the packet count in the traffic class, the TCP data packet count in the class, the TCP retransmit packet count in the class, and the peak number of active TCP flows in the class, as well as a "class hits" count characterizing the number of flows that were matched to a given traffic class. Of course, measurement engine 140 can be configured to record and maintain a variety of network utilization and performance related data.

In one embodiment, measurement engine 140 monitors operation of bandwidth management device 130 and maintains values (e.g., packet counts, peak bandwidth utilization values, and other quantities) for various network operation, utilization and performance statistics. In one embodiment, measurement engine 140 maintains such values in volatile memory and, at periodic intervals, stores the data in persistent memory, such as a hard drive, with a time stamp and clears the network statistic values in the volatile memory space. As discussed above, network statistic data can be stored in association with identifiers for access link 21, as well as for various partitions and traffic classes associated with the current configuration of bandwidth management device 130. In one embodiment, measurement engine 140 stores network statistic data in persistent memory at one-minute intervals; however, other suitable time intervals can be chosen as a matter of engineering design or administrative need. In addition, the persistent memory, in one embodiment, includes sufficient capacity to store a large amount of network management data, such as data for a period of 24, 48, or 72 hours.

In one embodiment, the time interval at which measurement engine 140 stores network management data in persistent memory is a configurable parameter. Additionally, measurement engine 140 includes APIs allowing other modules to access the raw measurement data. In one embodiment, measurement engine 140 includes APIs and associated functionality that aggregates raw measurement data over specified time intervals (e.g., the last hour, 15 minutes, day, etc.).

B.5. Enforcement of Bandwidth Utilization Controls

Figure 7:
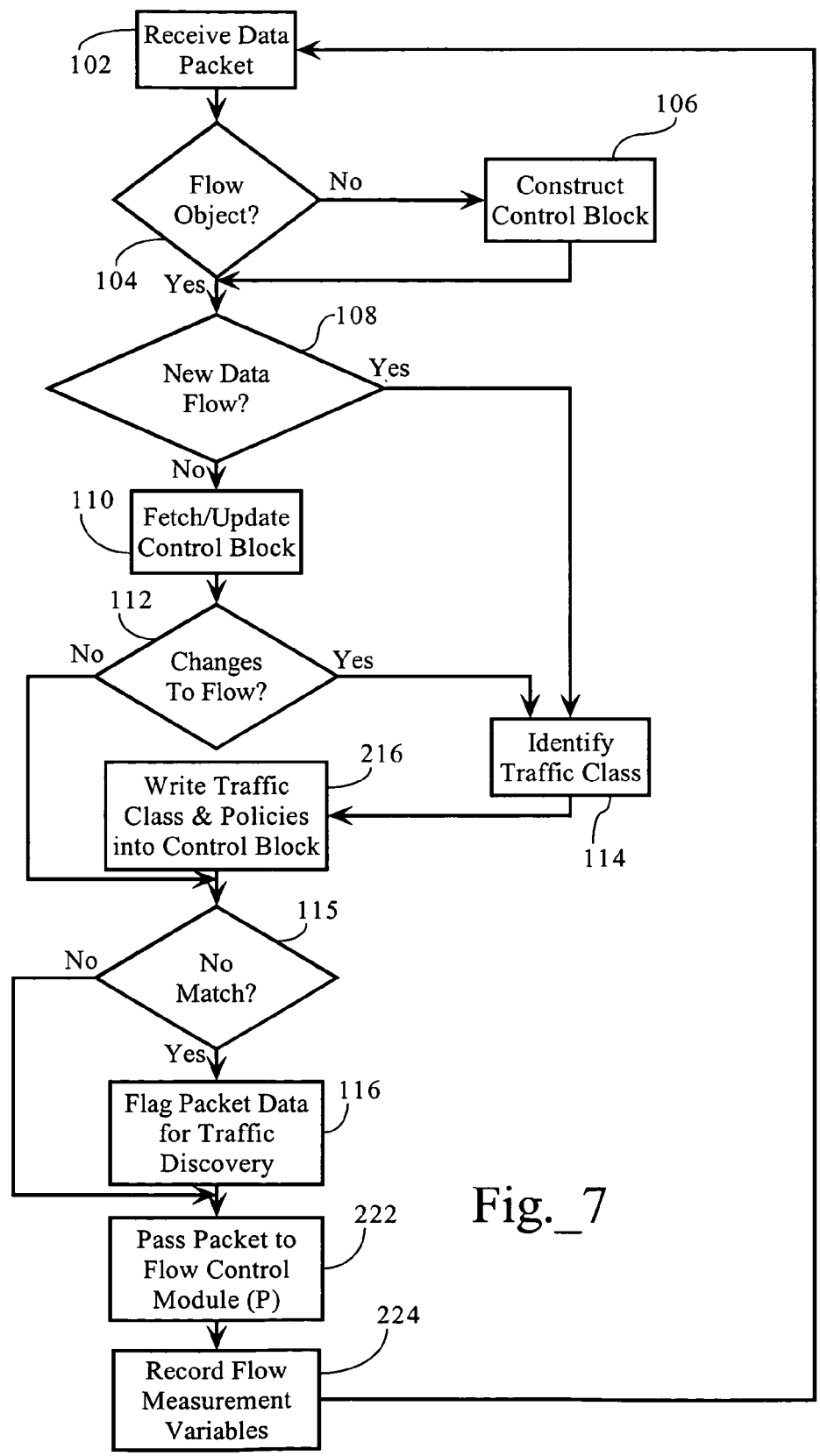
FIG. 7 is a flow chart diagram showing a method, according to an implementation of the present invention, directed to enforcing bandwidth utilization controls on data flows.

FIG. 7 illustrates a method, according to one embodiment of the present invention, directed to the enforcement of bandwidth utilization controls on data flows transmitted across access link 21 and, therefore, traversing bandwidth management device 130. The method for enforcing bandwidth utilization controls, however, is not critical to the present invention; any suitable method can be employed.

In one embodiment, packet processor 82 receives a data packet (FIG. 7, 102) and determines whether flow database 135 contains an existing control (flow) block object corresponding to the data flow (104) (see Section A.1., supra). If no control block object corresponds to the data packet, packet processor 131 constructs a control block object including attributes characterizing the data flow, such as source address, destination address, service type, etc. (106) (see above). If a control block object is found, as FIG. 7 illustrates, packet processor 82 then determines whether the received packet is part of a new data flow (108) or represents a change to an existing data flow (see 110, 112) (see above). If the data packet does not signify a new data flow, packet processor 131 retrieves the control block object, and associates the packet with the control block object (110). If elements of the data packet represent a change to the traffic type associated with the data flow (112), packet processor 82 passes the flow specification object to traffic classification engine 86 to identify a traffic class corresponding to the flow (114).

As discussed above, to identify a traffic class associated with the data flow, packet processor 82 passes the control block object (or a pointer to the control block object) to traffic classification engine 86. In one embodiment, the control block object or a copy of it is stored in association with the packet and in the same buffer structure to facilitate access to the control block object by traffic classification engine 86. As discussed in more detail below, traffic classification engine 86 operates on attributes of the control block object and/or flow specification object, (and potentially on the packet stored in the buffer structure) to identify traffic class(es) associated with the data flow (114). In one embodiment, the control block object in flow database 135 includes a pointer to the identified traffic class(es) in traffic classification engine 137. In one embodiment, the traffic classification engine 137 writes in the control block object the policy parameters (e.g., bandwidth utilization control parameters, security policies, etc.) associated with the identified traffic classes (116). As discussed above, if the data flow does not match an existing traffic class (115), packet processor 82 or traffic classification database 86 flags the packet for traffic discovery module (116). In one embodiment, a data flow that does not match an existing traffic class is classified in the default traffic class. The traffic discovery module operates on attributes of the data flow to classify it as discussed above. If the identified traffic class exceeds a discovery threshold, the traffic discovery module, in one implementation, adds the discovered traffic class to traffic classification database 86. In one implementation, the traffic discovery module also writes default bandwidth utilization controls and/or other policies (such as security or redirection policies) into traffic classification database 86. In another embodiment, newly discovered traffic classes can be added to a separate list, or other data structure, from which a network administrator may elect to add to the traffic classification configuration maintained by traffic classification database 86.

Packet processor 82 then passes the packet to rate control module 132 (222) which accesses the control block object corresponding to the data flow to retrieve the bandwidth utilization or other controls (e.g., partition, policy, security controls, etc.) associated with the traffic class and enforces the bandwidth utilization controls on the data packet flow. As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. As FIG. 7 illustrates, packet processor 131 also records or updates various measurement values in the control block object that characterize the flow (e.g., last packet time, packet count, byte count, etc.) (224). In addition, measurement engine 140, in one embodiment, records data associated with the packet to allow for analysis of bandwidth utilization and other network statistics on a traffic class, access link, and/or partition level.

Lastly, although the present invention has been described as operating in connection with end systems and networks primarily employing the HTTP, TCP and IP protocols, the present invention has application in computer network environments employing any suitable session layer, transport layer and network layer protocols. Moreover, one skilled in the art will recognize that the present invention can be applied to process a vast array of interface definition types and protocols in order to generate classification configurations for web services network traffic. Accordingly, the present invention has been described with reference to specific embodiments. Other embodiments of the present invention will be apparent to one of ordinary skill in the art. It is, therefore, intended that the claims set forth below not be limited to the embodiments described above.

APPENDIX

<?xml version="1.0"?>

<definitions name="PriceCheck"

targetNamespace="http://webservice.com/pricecheck.wsdl"
   xmlns:tns="http://webservice.com/pricecheck.wsdl"
   xmlns:xsdl="http://webservice.com/pricecheck.xsd"
   xmlns:soap="http://schemas.xmlsoap.org/wsdl/soap/"
   xmins="http://schemas.xmisoap.org/wsdl/">
  <types>
  <schema      targetNamespace="http://webservice.com/pricecheck.xsd"
    xmlns="http://www.w3.org/2000/10/XMLSchema">
    <element name="TradePriceRequest">
     <complexType>
      <all>
       <element name="tickerSymbol" type="string"/>
      </all>
     </complexType>
    </element>
    <element name="TradePrice">
     <complexType>
      </all>
     </schema>
  </types>
  <message name="GetLastTradePriceInput">
    <part name="body" element="xsdl:TradePriceRequest"/>
  </message>
  <message name="GetLastTradePriceOutput">
    <part name="body" element="xsaTradePrice"/>

```
</message>
<portType name="PriceCheckPortType">
  <operation name="GetLastTradePrice">
    <input message="tns:GetLastTradePriceInput"/>
    <output message="tns:GetLastTradePriceOutput"/>
  </operation>
</portType>
<binding name="PriceCheckSoapBinding"
    type="PriceCheckPortType">
  <soap:binding style="document" transport="http://
    schemas.xmlsoap.org/soap/http"/>
  <operation name="GetLastTradePrice">
    <soap:operation soapAction="http://webservice-
      .com/GetLastTradePrice"/>
    <input>
      <soap:body use="literal"/>
    </input>
    <output>
      <soap:body use="literal"/>
    </output>
  </operation>
</binding>
<service name="PriceCheckService">
  <documentation>My first service</documentation>
  <port name="PriceCheckPort"
    binding="PriceCheckSoapBinding">
    <soap:address location="http://webservice.com/
      pricecheck"/>
  </port>
</service>
</definitions>
```

What is claimed is:

1. A method facilitating the classification of web services network traffic, comprising:
  discovering, at a network device, one or more web services based on web service invocation messages received at the network device;
  maintaining a tracking list data structure comprising, for each discovered web service, a web service identifier corresponding to the web service and a transaction count associated with the web service;
  incrementing, responsive to a message indicating a new web services network transaction, a transaction count associated with the web service identified in the message;
  presenting, in a user interface, one or more of the web service identifiers and corresponding transaction counts, wherein the user interface allows for selection of one or more web service identifiers; and
  configuring, responsive to selection of a web service identifier, a network traffic classification mechanism to identify the web service corresponding to the web service identifier, comprising:
    creating a traffic class identifier corresponding to the web service;
    creating at least one matching rule defining an attribute of the web service;
    associating the at least one matching rule to the traffic class identifier in the traffic classification mechanism;
    receiving an interface definition document defining the attributes of the web service;
    processing the interface definition document to identify at least one traffic class corresponding to the web service, comprising:
      defining a first traffic class corresponding to the web service;
      defining at least a second traffic class corresponding to a binding supported by the web service; and
      associating at least the second traffic class as a child traffic class of the first traffic class in a hierarchical traffic classification scheme; and
    configuring a network traffic classification mechanism to identify the at least one traffic class based on at least one attribute obtained from the web services definition document.

2. A method facilitating the classification of web services network traffic, comprising:
  discovering, at a network device, one or more web services based on web service invocation messages received at the network device;
  maintaining a tracking list data structure comprising, for each discovered web service, a web service identifier corresponding to the web service and a transaction count associated with the web service;
  incrementing, responsive to a message indicating a new web services network transaction, a transaction count associated with the web service identified in the message;
  presenting, in a user interface, one or more of the web service identifiers and corresponding transaction counts, wherein the user interface allows for selection of one or more web service identifiers; and
  configuring, responsive to selection of a web service identifier, a network traffic classification mechanism to identify the web service corresponding to the web service identifier, comprising:
    creating a traffic class identifier corresponding to the web service;
    creating at least one matching rule defining an attribute of the web service;
    associating the at least one matching rule to the traffic class identifier in the traffic classification mechanism;
    receiving an interface definition document defining the attributes of the web service;
    processing the interface definition document to identify at least one traffic class corresponding to the web service, comprising:
      defining a first traffic class corresponding to the web service;
      defining at least a second traffic class corresponding to an operation of the web service; and
      associating at least the second traffic class as a child traffic class of the first traffic class in a hierarchical traffic classification scheme; and
    configuring a network traffic classification mechanism to identify the at least one traffic class based on at least one attribute obtained from the web services definition document.

3. The method of claim 2 wherein the web services interface definition document is a WSDL document.

4. The method of claim 2 wherein the attribute in the second creating step is the web service identifier corresponding to the web service.

5. The method of claim 4 further comprising creating at least one additional matching rule defining an attribute of the web service.

6. The method of claim 5 wherein the attribute in the third creating step is a protocol associated with the web service.

7. The method of claim 6 wherein the protocol is a web services protocol.

8. The method of claim 6 wherein the protocol is the SOAP protocol.

9. The method of claim 6 wherein the protocol is the HTTP protocol.

10. The method of claim 2 further comprising maintaining a count of a number of data flows corresponding to each web service traversing the communications path.

11. The method of claim 2 wherein the web service identifier comprises a host name.

12. The method of claim 2 wherein the web service identifier comprises a host name and a uniform resource indicator.

13. The method of claim 2 wherein the configuring step is performed in response to a command from an end user.

14. The method of claim 2 wherein the monitoring step comprises
   upon detection of a new data flow,
      parsing at least one packet in the data flow to identify the protocol attributes corresponding to the data flow;
      matching the identified protocol attributes to a predetermined set of web services protocol attributes to determine whether the data flow is web services web services data flow.

15. The method of claim 14 wherein the parsing step comprises parsing the at least one packet in the data flow into a flow specification, wherein the flow specification contains at least one instance of any one of the following: a protocol family designation, a direction of packet flow designation, a protocol type designation, a binding type, a pair of hosts, a pair of ports, a pointer to a MIME type, a pointer to an application-specific attribute.

16. The method of claim 2 further comprising
   subsequent to the configuring step, processing the latest interface definition document corresponding to the web service to determine whether changes to the configuration of the network traffic classification mechanism are required.

17. The method of claim 2 wherein the tracking list data structure comprises a hash table including one or more entries, wherein each entry comprises a key value and a transaction count, wherein the key value is generated by applying a hashing function to a host name and URI pair identified in messages initiating web services network transactions.

18. The method of claim 2 further comprising applying one or more bandwidth utilization controls to data flows based on the web services traffic classes associated with the data flows by the traffic classification mechanism.

19. An apparatus facilitating the classification of web services network traffic, comprising
   a packet processor operative to
      detect data flows in network traffic traversing a network;
   a traffic classification database operative to
      match data flows against a plurality of traffic classes, wherein each traffic class in the plurality of traffic classes is defined by at least one matching attribute;
   a web services classification module operative to
      identify web services in the data flows traversing the network;
      discover one or more web services based on web service invocation messages received at the packet processor;
      maintain a tracking data structure comprising, for each discovered web service, a web service identifier corresponding to the web service and a count of the number of web services network transactions detected in the data flows traversing the network;
      increment, responsive to a message indicating a new web services network transaction, a transaction count associated with the web service identified in the message;
      present, in a user interface, one or more of the web service identifiers and corresponding transaction counts, wherein the user interface allows for selection of one or more web service identifiers; and
      create, responsive to selection of a web service identifier, a traffic class in the traffic classification database for a selected web service in the data structure, wherein at least one matching rule associated with the traffic class includes the web service identifier associated with the web service;
      receive an interface definition document defining the attributes of the selected web service and an operation of the selected web service;
      process the interface definition document to identify at least a first traffic class corresponding to the selected web service and at least a second traffic class corresponding to the operation of the selected web service; and
      create the at least the first traffic class and the second traffic class in the traffic classification database, wherein at least one matching rule associated with the corresponding first traffic class and second traffic class is based on one or more of the attributes in the interface definition document.

20. The apparatus of claim 19 wherein the at least one traffic class is identified relative to the bindings identified in the interface definition document.

21. The apparatus of claim 19 wherein, to process the interface definition document, the web services classification module is further operative to
   define a first traffic class corresponding to the web service;
   define at least a second traffic class corresponding to an attribute of the web service; and
   associate the at least a second traffic class as a child traffic class of the first traffic class in a hierarchical traffic classification scheme.

22. The apparatus of claim 21 wherein the attribute in the second defining step is an operation of the web service.

23. The apparatus of claim 21 wherein the attribute in the second defining step is a binding supported by the web service.

24. The apparatus of claim 19 wherein the tracking data structure comprises a hash table including one or more entries, wherein each entry comprises a key value and a transaction count, wherein the key value is generated by applying a hashing function to a host name and URI pair identified in messages initiating web services network transactions.

* * * * *